//  US010007786B1

(12) United States Patent
Bhatkar et al.

(10) Patent No.: US 10,007,786 B1
(45) Date of Patent: Jun. 26, 2018

(54) SYSTEMS AND METHODS FOR DETECTING MALWARE

(71) Applicant: Symantec Corporation, Mountain View, CA (US)

(72) Inventors: Sandeep Bhatkar, Sunnyvale, CA (US); Jugal Parikh, Mountain View, CA (US); Carey Nachenberg, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 156 days.

(21) Appl. No.: 14/953,305

(22) Filed: Nov. 28, 2015

(51) Int. Cl.
*G06F 21/56* (2013.01)
*G06N 99/00* (2010.01)

(52) U.S. Cl.
CPC .......... *G06F 21/566* (2013.01); *G06F 21/561* (2013.01); *G06N 99/005* (2013.01)

(58) Field of Classification Search
CPC . H04L 63/1425; G06F 21/561; G06F 21/566; G06N 99/005
See application file for complete search history.

(56) References Cited

U.S. PATENT DOCUMENTS

| 6,775,780 | B1 |   | 8/2004  | Muttik    |              |
|-----------|----|---|---------|-----------|--------------|
| 7,694,128 | B2 | * | 4/2010  | Judge     | H04L 51/12   |
|           |    |   |         |           | 380/282      |
| 8,214,365 | B1 | * | 7/2012  | Manadhata | G06K 9/6272  |
|           |    |   |         |           | 707/737      |
| 8,826,439 | B1 | * | 9/2014  | Hu        | G06F 21/56   |
|           |    |   |         |           | 726/24       |
| 8,977,620 | B1 | * | 3/2015  | Buryak    | G06F 17/30707|
|           |    |   |         |           | 707/737      |
| 9,002,848 | B1 | * | 4/2015  | Peng      | G06F 17/3071 |
|           |    |   |         |           | 707/737      |
| 9,152,703 | B1 | * | 10/2015 | Satish    | G06F 17/30705|
| 9,185,119 | B1 | * | 11/2015 | Tamersoy  | H04L 63/14   |
| 9,250,993 | B2 | * | 2/2016  | Mani      | G06F 17/30598|
| 9,280,593 | B1 | * | 3/2016  | Dykstra   | G06F 17/30598|
| 9,317,393 | B2 | * | 4/2016  | Poola     | G06F 11/3452 |
| 9,342,795 | B1 | * | 5/2016  | Poole     | G06N 5/00    |

(Continued)

OTHER PUBLICATIONS

Yunpeng Deng; Systems and Methods for Detecting Character Encodings of Text Streams; U.S. Appl. No. 13/443,677 filed Apr. 10, 2012.

(Continued)

*Primary Examiner* — Beemnet Dada
*Assistant Examiner* — Stephen Gundry
(74) *Attorney, Agent, or Firm* — FisherBroyles, LLP

(57) ABSTRACT

A computer-implemented method for detecting malware may include (1) identifying a behavioral trace of a program, the behavioral trace including a sequence of runtime behaviors exhibited by the program, (2) dividing the behavioral trace to identify a plurality of n-grams within the behavioral trace, each runtime behavior within the sequence of runtime behaviors corresponding to an n-gram token, (3) analyzing the plurality of n-grams to generate a feature vector of the behavioral trace, and (4) classifying the program based at least in part on the feature vector of the behavioral trace to determine whether the program is malicious. Various other methods, systems, and computer-readable media are also disclosed.

20 Claims, 9 Drawing Sheets

(56) References Cited

U.S. PATENT DOCUMENTS

| | | | |
|---|---|---|---|
| 9,367,814 B1* | 6/2016 | Lewis | G06N 99/005 |
| 9,607,103 B2* | 3/2017 | Anderson | G06F 17/30979 |
| 9,652,616 B1* | 5/2017 | Bhatkar | G06F 21/566 |
| 9,684,705 B1* | 6/2017 | Satish | G06F 17/30598 |
| 9,727,633 B1* | 8/2017 | Dykstra | G06F 17/30598 |
| 9,762,593 B1* | 9/2017 | Kennedy | H04L 63/1416 |
| 9,769,189 B2* | 9/2017 | Mohaisen | H04L 63/1425 |
| 9,836,576 B1* | 12/2017 | Do | G06F 19/18 |
| 2003/0167402 A1* | 9/2003 | Stolfo | H04L 51/12 726/23 |
| 2007/0192863 A1* | 8/2007 | Kapoor | G06F 9/505 726/23 |
| 2008/0262991 A1* | 10/2008 | Kapoor | G06F 21/55 706/20 |
| 2011/0029475 A1* | 2/2011 | Gionis | G06N 99/005 706/52 |
| 2011/0214157 A1* | 9/2011 | Korsunsky | G06F 21/55 726/1 |
| 2011/0231564 A1* | 9/2011 | Korsunsky | G06F 21/55 709/231 |
| 2012/0011153 A1* | 1/2012 | Buchanan | G06F 21/552 707/771 |
| 2013/0191915 A1* | 7/2013 | Antonakakis | H04L 63/14 726/23 |
| 2013/0332773 A1* | 12/2013 | Yuan | G05B 23/0229 714/26 |
| 2013/0346346 A1* | 12/2013 | Criminisi | G06N 99/005 706/12 |
| 2014/0090061 A1* | 3/2014 | Avasarala | G06F 21/56 726/24 |
| 2015/0032759 A1* | 1/2015 | Lee | G06F 17/30705 707/741 |
| 2015/0039613 A1* | 2/2015 | Li | G06F 17/30705 707/737 |
| 2015/0067839 A1* | 3/2015 | Wardman | G01F 11/263 726/22 |
| 2015/0134660 A1* | 5/2015 | Yan | G06F 17/30598 707/737 |
| 2015/0161248 A1* | 6/2015 | Majkowska | G06F 17/30011 707/737 |
| 2015/0244733 A1* | 8/2015 | Mohaisen | H04L 63/1425 726/23 |
| 2015/0371633 A1* | 12/2015 | Chelba | G10L 15/063 704/240 |
| 2016/0026404 A1* | 1/2016 | Taylor | G06F 3/0685 711/163 |
| 2016/0065534 A1* | 3/2016 | Liu | H04L 63/1441 707/728 |
| 2016/0078359 A1* | 3/2016 | Csurka | G06N 7/005 706/12 |
| 2016/0085857 A1* | 3/2016 | Clark | G06F 17/30705 707/722 |
| 2016/0140208 A1* | 5/2016 | Dang | G06F 17/30943 707/737 |
| 2016/0164901 A1* | 6/2016 | Mainieri | G06N 7/005 726/23 |
| 2016/0261612 A1* | 9/2016 | Mesdaq | H04L 63/145 |
| 2016/0314184 A1* | 10/2016 | Bendersky | G06F 17/30705 |
| 2016/0357965 A1* | 12/2016 | Prowell | G06F 21/566 |
| 2016/0364558 A1* | 12/2016 | Rome | G06F 21/316 |
| 2017/0083825 A1* | 3/2017 | Battersby | G06N 99/005 |
| 2017/0099304 A1* | 4/2017 | Anderson | H04L 63/1416 |
| 2017/0161326 A1* | 6/2017 | Anderson | G06F 17/30466 |
| 2017/0300532 A1* | 10/2017 | Simhon | G06F 17/30495 |

OTHER PUBLICATIONS

Haik Mesropian; Systems and Methods for Securing Computing Devices Against Imposter Processes; U.S. Appl. No. 13/926,050, filed Jun. 25, 2013.

Tandon, Gaurav et al., "Learning Rules from System Call Arguments and Sequences for Anomaly Detection", https://repository.lib.fit.edu/handle/11141/127, as accessed Sep. 29, 2015, (Jun. 11, 2003).

Warrender, C. et al., "Detecting intrusions using system calls: alternative data models", http://ieeexplore.ieee.org/stamp/stamp.jsp?tp=&arnumber=766910, as accessed Sep. 29, 2015, 1999 IEEE Symposium on Security and Privacy, Oakland, CA, (May 9-12, 1999).

"Preventing emerging threats with Kaspersky System Watcher", http://www.kaspersky.fr/images/Kaspersky_Lab_Whitepaper_System_Watcher_ENG.pdf, as accessed Sep. 29, 2015, Kaspersky Lab, (Jun. 2014).

* cited by examiner

SYSTEMS AND METHODS FOR DETECTING MALWARE

BACKGROUND

Consumers and businesses face a growing tide of malicious software that threatens the stability and performance of their computers and the security of their data. Computer programmers with malicious motivations have created and continue to create viruses, Trojan horses, worms, and other programs (collectively known as "malware") in an attempt to compromise computer systems. In an attempt to evade detection, malicious programmers may inject malware into or among legitimate programs.

Many security software companies attempt to combat malware by creating and deploying malware signatures (e.g., strings representing known malware code) to their customers on a regular basis. However, a significant amount of malware has not yet been identified and therefore cannot be detected using traditional signature-based malware-detection mechanisms, particularly since malware authors may regularly modify their malware in an attempt to circumvent commonly employed signature-based malware-detection mechanisms.

Additionally, some malware may pose as programs known to be legitimate (e.g., to disguise its presence from users and avoid removal). In some cases, these imposter programs may place additional malware on computing systems, and traditional signature-based methods of detection may fail to detect some or all of the additional malware. Accordingly, the instant disclosure identifies and addresses a need for additional and improved systems and methods for securing computing devices against imposter processes.

Accordingly, the instant disclosure identifies and addresses a need for additional and improved systems and methods for detecting malware.

SUMMARY

As will be described in greater detail below, the instant disclosure generally relates to systems and methods for detecting malware by generating n-grams from behavioral traces of programs in order to analyze sequential behavioral features of programs that may be indicative of malware. In addition, in some examples these systems and methods may limit the sizes of behavioral feature vectors describing programs while maintaining their efficacy for classifying the programs by mapping n-grams for a program onto a reduced space (e.g., via hashing) in the process of constructing a behavioral feature vector describing the behavior of the program.

In one example, a computer-implemented method for detecting malware may include (1) identifying a behavioral trace of a program, the behavioral trace including a sequence of runtime behaviors exhibited by the program, (2) dividing the behavioral trace to identify a group of n-grams within the behavioral trace, each runtime behavior within the sequence of runtime behaviors corresponding to an n-gram token, (3) analyzing the n-grams to generate a feature vector of the behavioral trace, and (4) classifying the program based at least in part on the feature vector of the behavioral trace to determine whether the program is malicious.

In some examples, analyzing the n-grams to generate the feature vector of the behavioral trace may include: applying, for each given n-gram in the n-grams, a feature function to the behavioral trace that describes an occurrence characteristic of the given n-gram within the behavioral trace and including a result of the feature function in the feature vector.

In one embodiment, the feature function may include a boolean function that outputs a predetermined boolean output for the given n-gram when the given n-gram was observed within the behavioral trace.

In one embodiment, the feature function may include a frequency function that outputs a value for the given n-gram that indicates a number of times the given n-gram was observed within the behavioral trace.

In one embodiment, the feature function may include a density function that outputs a value for the given n-gram that indicates a relative frequency with which the given n-gram was observed within the behavioral trace.

In one embodiment, the feature vector may include a group of dimensions, each n-gram within the n-grams corresponding to a dimension within the dimensions.

In one embodiment, the n-grams map to the dimensions according to a surjection and including the result of the feature function in the feature vector includes aggregating a subset of outputs of the feature function derived from a subset of the n-grams into a value and assigning the value to a dimension within the dimensions according to the surjection.

In some examples, identifying the n-grams within the behavioral trace may include identifying the n-grams within a substring of the behavioral trace.

In some examples, identifying the n-grams within the substring of the behavioral trace may include identifying the n-grams within a prefix of the behavioral trace.

In some examples, identifying the n-grams within the substring of the behavioral trace may include dividing the behavioral trace into a group of fixed-length substrings and identifying the n-grams within a fixed-length substring within the fixed-length substrings.

In one embodiment, (1) generating the feature vector of the behavioral trace may include generating a group of feature vectors of the behavioral trace, the feature vectors within the feature vectors differing by at least one of (a) feature functions applied to n-grams sampled from the behavioral trace to generate respective feature vectors and (b) subsets of n-grams selected from the behavioral trace to generate respective feature vectors and (2) classifying the program based at least in part on the feature vector of the behavioral trace may include submitting each of the feature vectors to a machine learning classifier.

In one embodiment, the sequence of runtime behaviors specifies a contextual runtime condition under which at least one runtime behavior was observed.

In one embodiment, a system for implementing the above-described method may include (1) an identification module, stored in memory, that identifies a behavioral trace of a program, the behavioral trace including a sequence of runtime behaviors exhibited by the program, (2) a division module, stored in memory, that divides the behavioral trace to identify a group of n-grams within the behavioral trace, each runtime behavior within the sequence of runtime behaviors corresponding to an n-gram token, (3) an analysis module, stored in memory, that analyzes the n-grams to generate a feature vector of the behavioral trace, (4) a classification module, stored in memory, that classifies the program based at least in part on the feature vector of the behavioral trace to determine whether the program is malicious, and (5) at least one physical processor configured to execute the identification module, the division module, the analysis module, and the classification module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a behavioral trace of a program, the behavioral trace including a sequence of runtime behaviors exhibited by the program, (2) divide the behavioral trace to identify a group of n-grams within the behavioral trace, each runtime behavior within the sequence of runtime behaviors corresponding to an n-gram token, (3) analyze the n-grams to generate a feature vector of the behavioral trace, and (4) classify the program based at least in part on the feature vector of the behavioral trace to determine whether the program is malicious.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
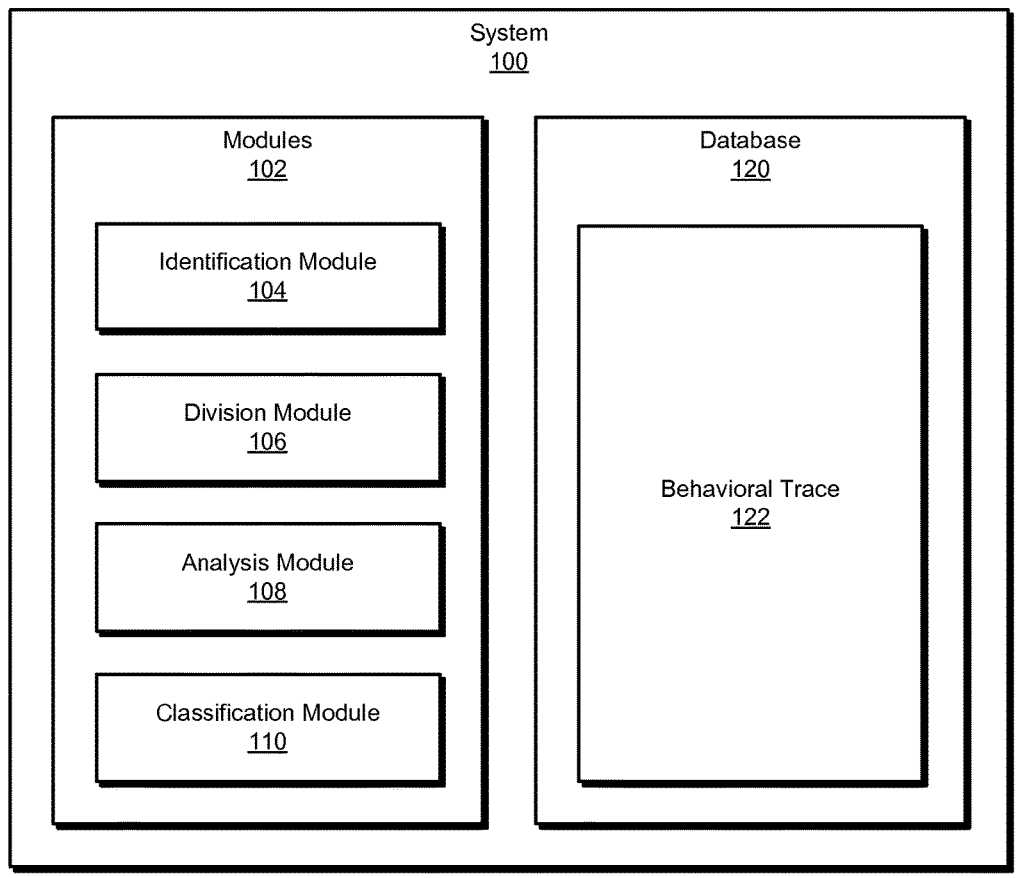
FIG. 1 is a block diagram of an exemplary system for detecting malware.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting malware. As will be explained in greater detail below, by generating n-grams from behavioral traces of programs in order to analyze sequential behavioral features of programs that may be indicative of malware, the systems described herein may detect malware (including, e.g., previously unobserved malware) accurately and efficiently. In addition, by limiting the sizes of behavioral feature vectors describing programs by mapping n-grams for a program onto a reduced space (e.g., via hashing) in the process of constructing a behavioral feature vector describing the behavior of the program, the systems described herein may successfully and efficiently evaluate a large set of behaviors and/or extended sequences of behaviors.

Figure 2:
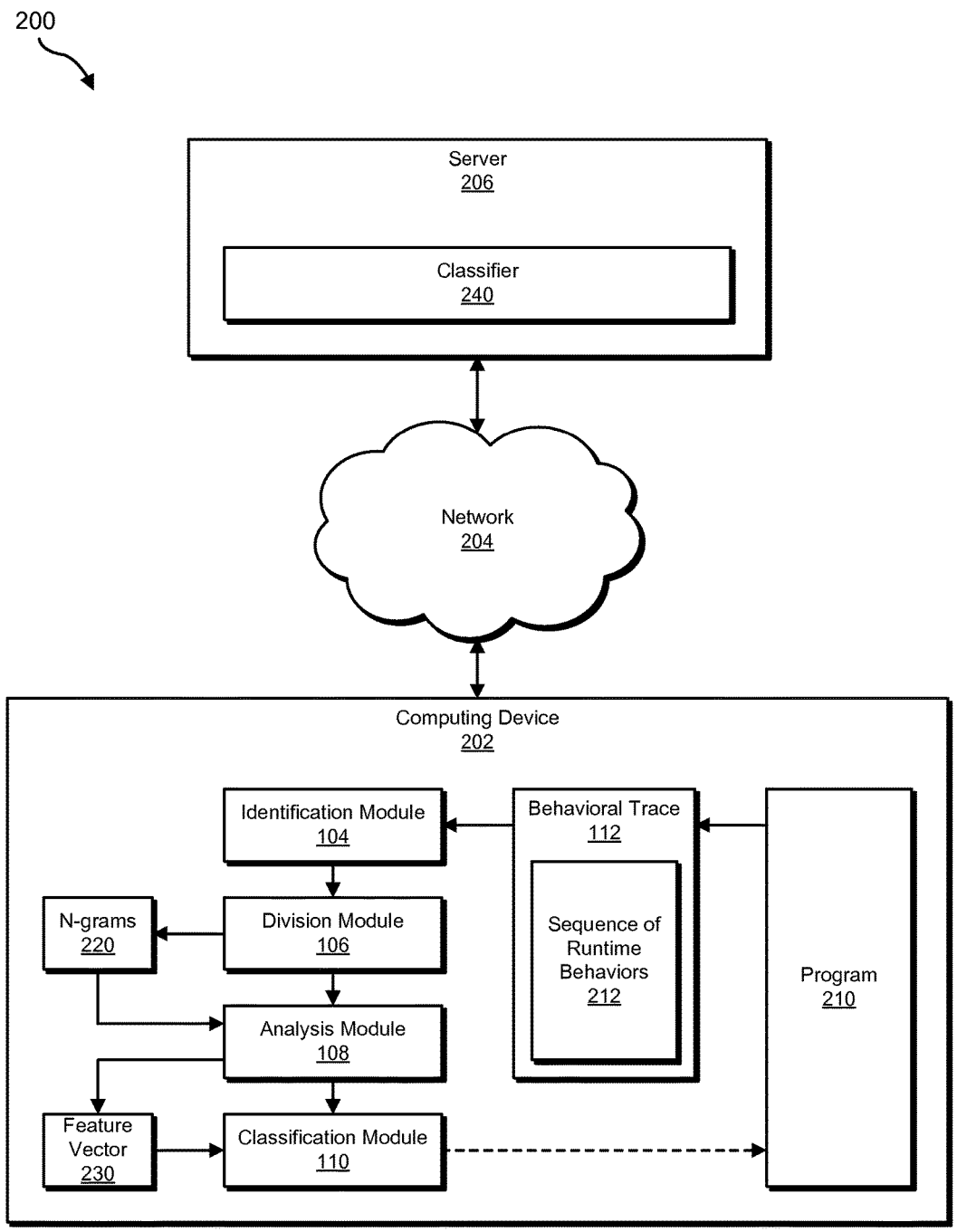
FIG. 2 is a block diagram of an additional exemplary system for detecting malware.
Figure 6:
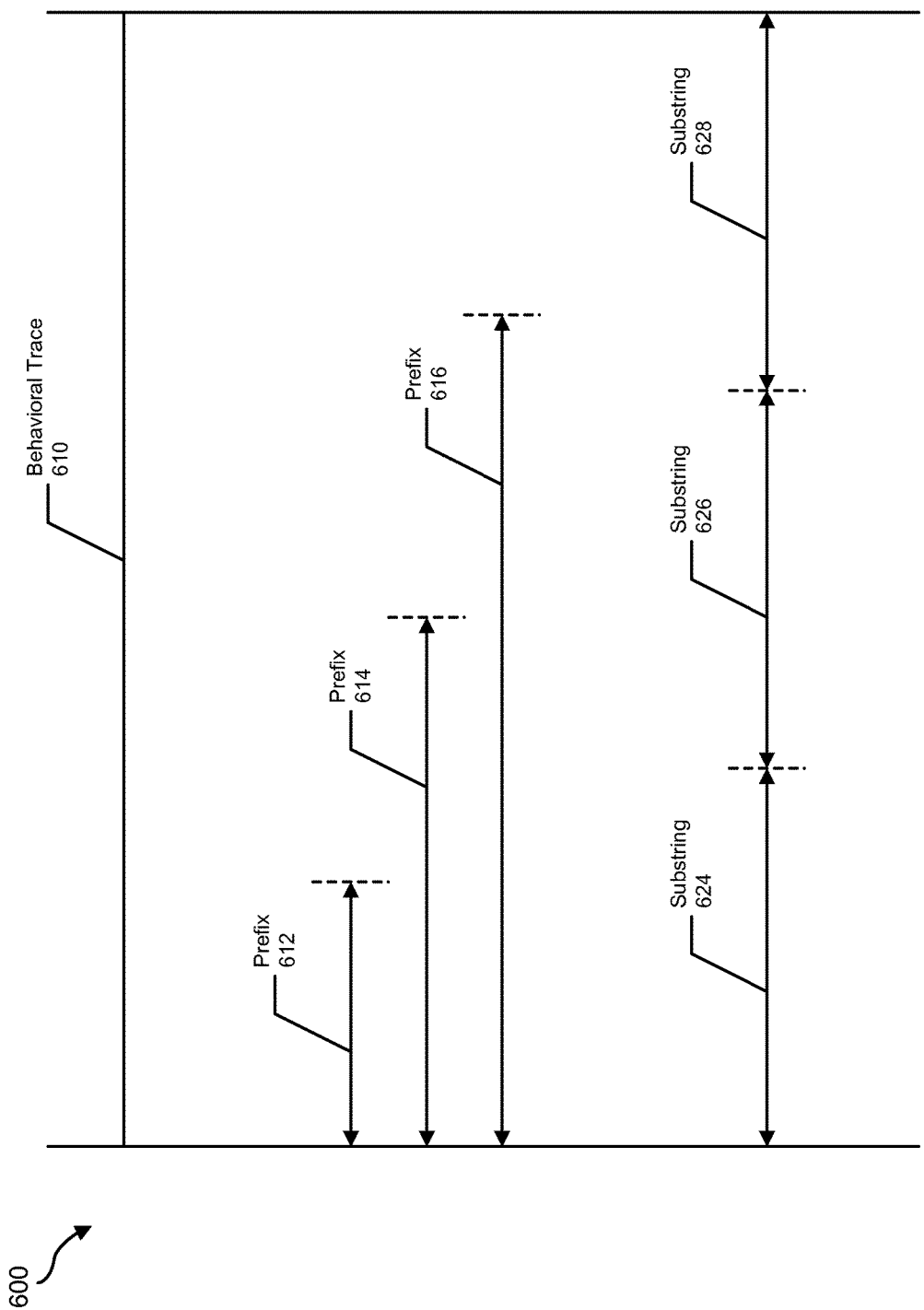
FIG. 6 is a block diagram of exemplary behavioral data for detecting malware.
Figure 7:
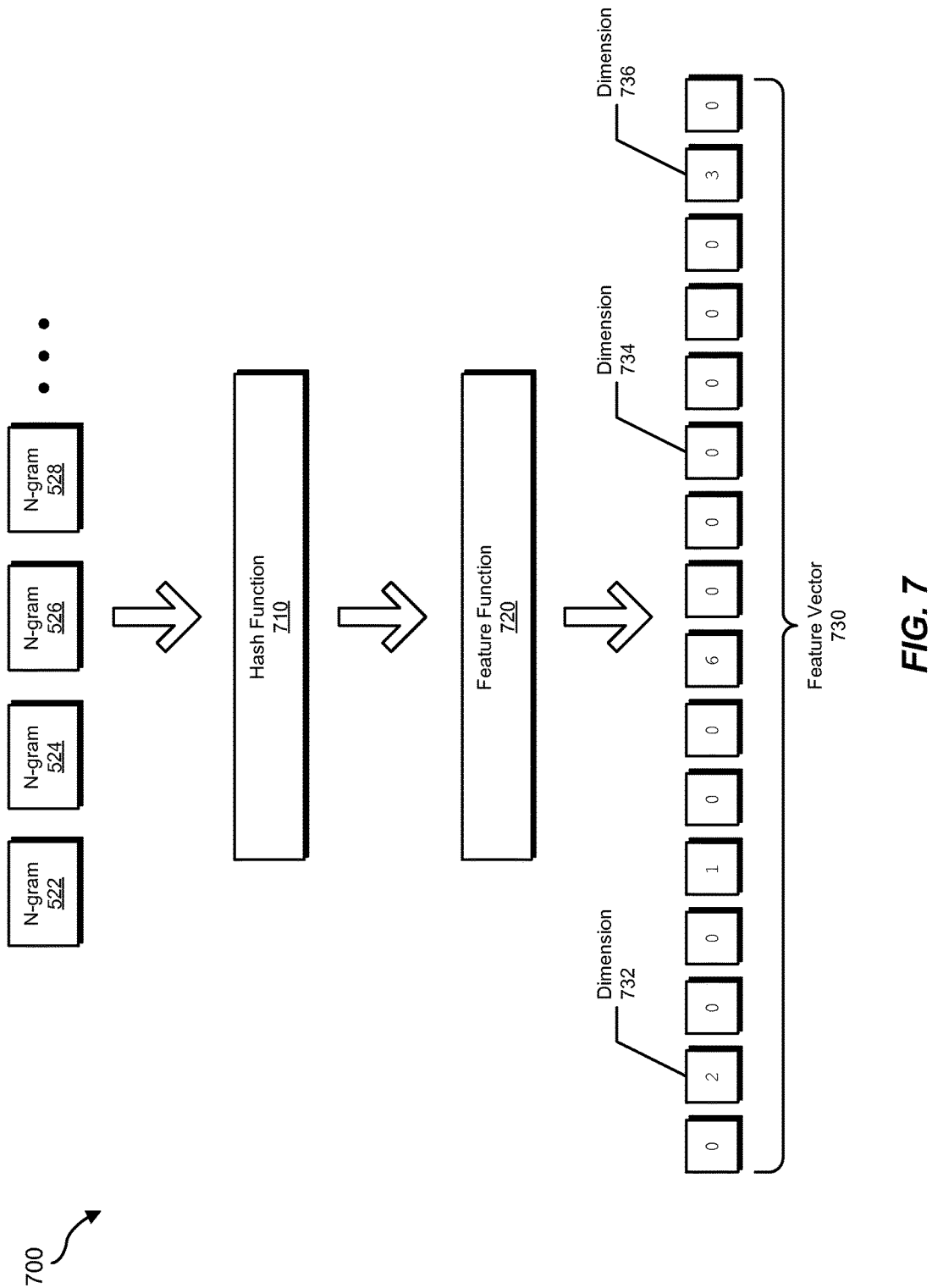
FIG. 7 is a block diagram of an exemplary computing system for detecting malware.

The following will provide, with reference to FIGS. 1, 2, and 7 detailed descriptions of exemplary systems for detecting malware. Detailed descriptions of corresponding computer-implemented methods will also be provided in connection with FIG. 3. Detailed descriptions of exemplary behavioral data for detecting malware will be provided in connection with FIGS. 4-6. In addition, detailed descriptions of an exemplary computing system and network architecture capable of implementing one or more of the embodiments described herein will be provided in connection with FIGS. 8 and 9, respectively.

FIG. 1 is a block diagram of exemplary system 100 for detecting malware. As illustrated in this figure, exemplary system 100 may include one or more modules 102 for performing one or more tasks. For example, and as will be explained in greater detail below, exemplary system 100 may include an identification module 104 that identifies a behavioral trace of a program, the behavioral trace that includes a sequence of runtime behaviors exhibited by the program. Exemplary system 100 may additionally include a division module 106 that divides the behavioral trace to identify a plurality of n-grams within the behavioral trace, each runtime behavior within the sequence of runtime behaviors corresponding to an n-gram token. Exemplary system 100 may also include an analysis module 108 that analyzes the plurality of n-grams to generate a feature vector of the behavioral trace. Exemplary system 100 may additionally include a classification module 110 that classifies the program based at least in part on the feature vector of the behavioral trace to determine whether the program is malicious. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 810 in FIG. 8, and/or portions of exemplary network architecture 900 in FIG. 9. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store behavioral data descriptive of one or more runtime behaviors observed in association with a program, such as a behavioral trace 122.

Database 120 may represent portions of a single database or computing device or a plurality of databases or computing devices. For example, database 120 may represent a portion of server 206 in FIG. 2, computing system 810 in FIG. 8, and/or portions of exemplary network architecture 900 in FIG. 9. Alternatively, database 120 in FIG. 1 may represent one or more physically separate devices capable of being accessed by a computing device, such as server 206 in FIG. 2, computing system 810 in FIG. 8, and/or portions of exemplary network architecture 900 in FIG. 9.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to detect malware in a program 210. For example, and as will be described in greater detail below, one or more of modules 102 may cause computing device 202 to prepare a feature vector 230 that may be used by a classifier 240 on server 206 to detect malware. In another example, one or more modules 102 may execute on a device that also executes a classifier such as classifier 240. For example, and as will be described in greater detail below, identification module 104 may identify behavioral trace 112 of program 210, behavioral trace 112 including a sequence of runtime behaviors 212 exhibited by program 210. Division module 106 may divide behavioral trace 112 to identify a plurality of n-grams 220 within behavioral trace 112, each runtime behavior within sequence of runtime behaviors 212 corresponding to an n-gram token. Analysis module 108 may analyze plurality of n-grams 220 to generate feature vector 230 of behavioral trace 112. Classification module 110 may classify program 210 based at least in part on feature vector 230 of behavioral trace 112 to determine whether program 210 is malicious.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 810 in FIG. 8, or any other suitable computing device.

Server 206 generally represents any type or form of computing device that is capable of reading computer-executable instructions. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 900 in FIG. 9, or the like. Network 204 may facilitate communication or data transfer using wireless or wired connections. In one embodiment, network 204 may facilitate communication between computing device 202 and server 206.

Figure 3:
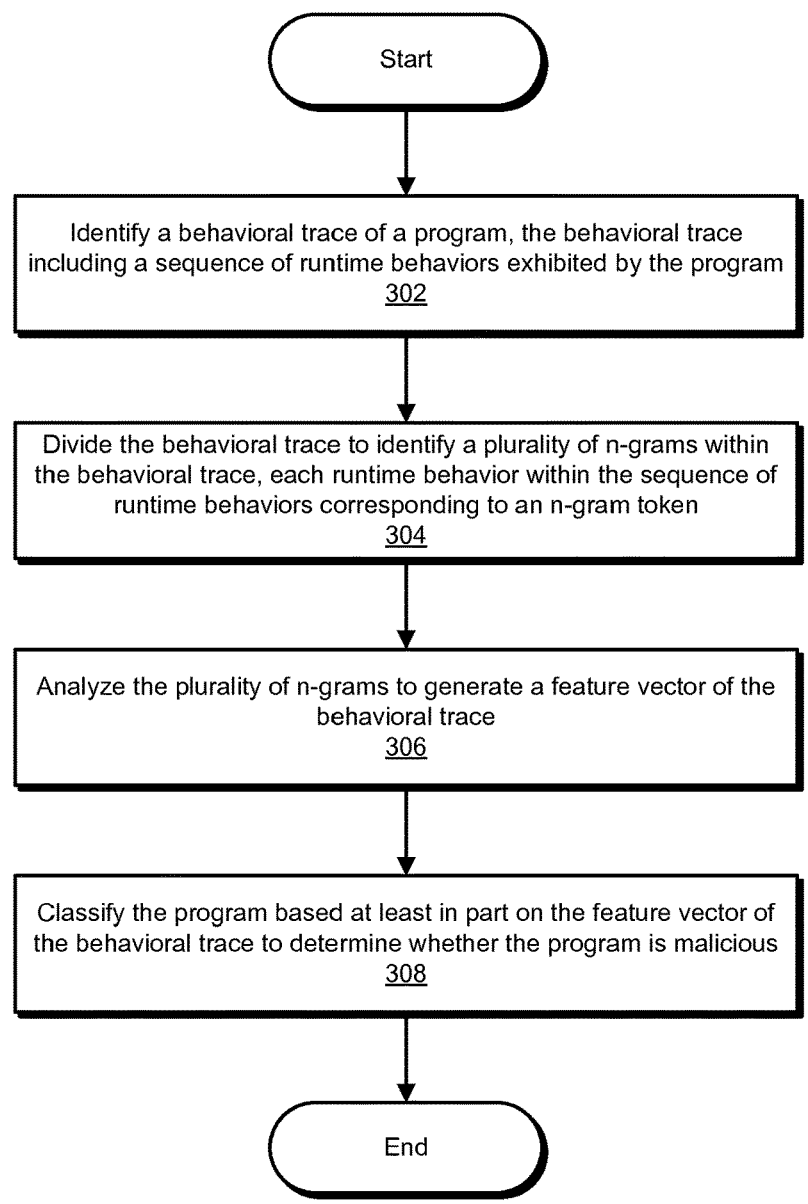
FIG. 3 is a flow diagram of an exemplary method for detecting malware.

FIG. 3 is a flow diagram of an exemplary computer-implemented method 300 for detecting malware. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 810 in FIG. 8, and/or portions of exemplary network architecture 900 in FIG. 9.

As illustrated in FIG. 3, at step 302, one or more of the systems described herein may identify a behavioral trace of a program, the behavioral trace including a sequence of runtime behaviors exhibited by the program. For example, identification module 104 may, as part of computing device 202 in FIG. 2, identify behavioral trace 112 of program 210, behavioral trace 112 including sequence of runtime behaviors 212 exhibited by program 210.

The term "behavioral trace," as used herein, may refer to any sequential trace, log, list, and/or record of runtime behaviors exhibited by a program (e.g., executed by the program, performed by the program, elicited by the program). As used herein, the term "behavior" may refer to any observable action, pattern of actions, event, and/or pattern of events observable in connection with the execution of a program. Examples of behaviors may include, without limitation, system calls and/or application programming interface (API) calls. In some examples, the sequence of runtime behaviors may specify a contextual runtime condition under which one or more of the runtime behavior was observed. For example, a behavior as identified in the behavioral trace may include both an action and/or event and contextual information relating to the action and/or event. Examples of contextual runtime conditions may include, without limitation, the number of threads running in a process (e.g., at the time of the event), the number of libraries loaded for a process (e.g., at the time of the event), a presence and/or absence of a graphical user interface in connection with the process (e.g., at the time of the event), etc.

In some examples, the sequence of runtime behaviors may specify, for each given runtime behavior in the sequence of runtime behaviors, a numeric feature that indicates the total number of runtime behaviors preceding the given runtime behavior within the sequence of runtime behaviors. For example, the sequence of runtime behaviors may specify an ordinal value for each runtime behavior that indicates how many runtime behaviors preceded the runtime behavior. Thus, in one example, a sequence of runtime behaviors (ev0, ev1, ev2, ev3) may include values (0, 1, 2, 3) specifying the position of the runtime behaviors within the sequence. In some examples, the sequence of runtime behaviors may explicitly include the above-described numeric feature. Additionally or alternatively, the sequence of runtime behaviors may implicitly indicate the numeric feature by virtue of being an ordered sequence. In some examples, one or more of the systems described herein may generate the numeric feature based on the ordering of the sequence of runtime behaviors. In some examples, one or more of the systems described herein may use the numeric feature indicating the ordering of the runtime behaviors within the sequence of runtime behaviors as contextual information (e.g., additional input) that characterizes the runtime behaviors within the sequence of runtime behaviors (e.g., in a statistical analysis and/or classification of one or more substrings of the sequence of runtime behaviors).

Figure 4:
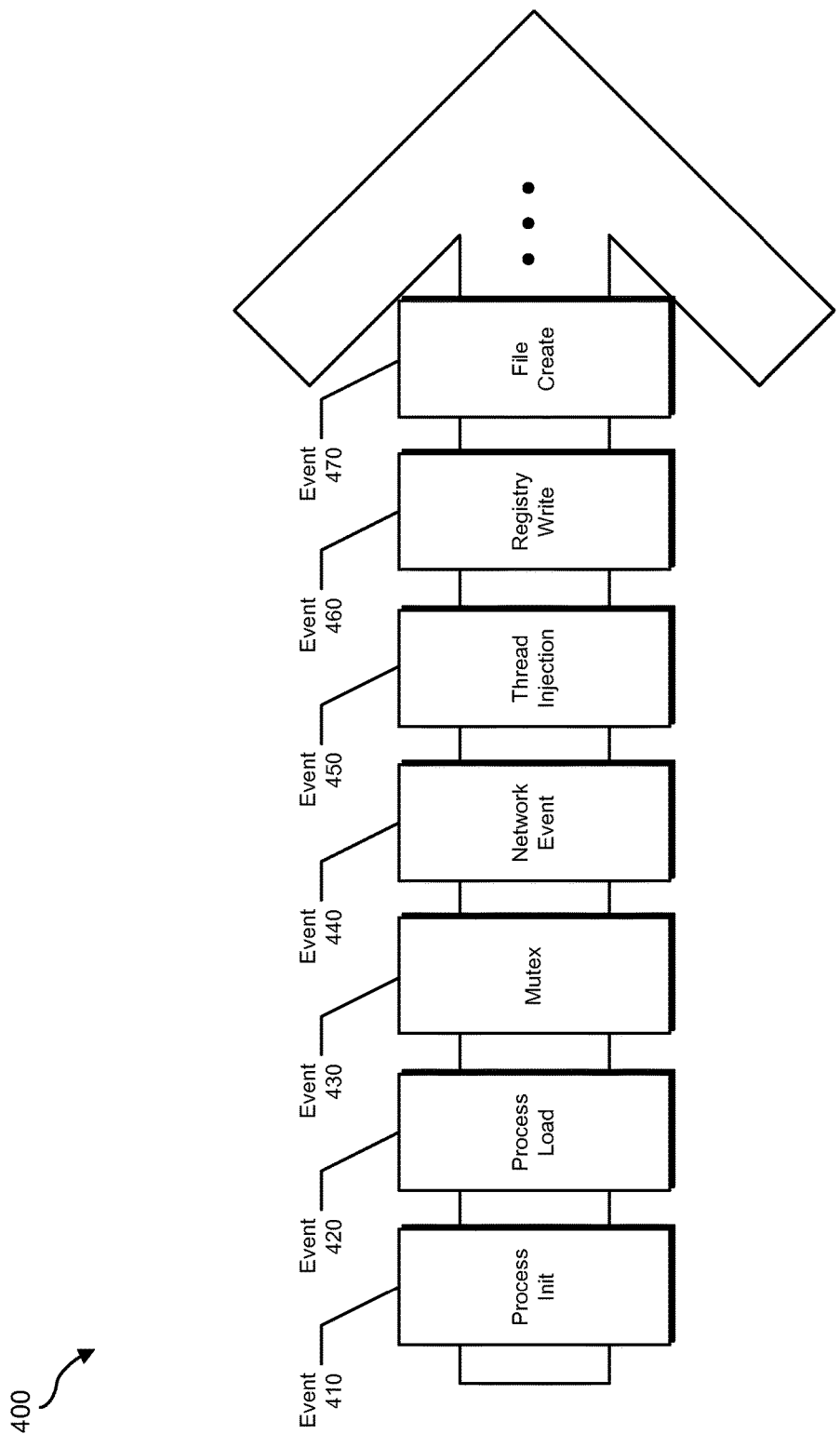
FIG. 4 is a block diagram of exemplary behavioral data for detecting malware.

To provide an example of a behavioral trace, FIG. 4 is a block diagram of an exemplary behavioral trace 400 for detecting malware. As shown in FIG. 4, behavioral trace 400 may include a recorded sequence of runtime events arising during the execution of a program. For example, behavioral trace 400 may include, in sequence, events 410, 420, 430, 440, 450, 460, and 470. For example, event 440 may include a network event recorded in behavioral trace 400. Event 450 may include a thread injection recorded in behavioral trace 400. Event 460 may include a registry write recorded in behavioral trace 400. Accordingly, behavioral trace 400 may record, in association with the execution of a process, a sequence of an observed network event, a thread injection, and a registry write (with, e.g., no intervening recorded events).

Identification module 104 may identify the behavioral trace in any of a variety of ways. For example, identification module 104 may receive the behavioral trace from a system that has monitored the program. Additionally or alternatively, identification module 104 may generate the behavioral trace by monitoring the program. In some examples, the behavioral trace may be generated (e.g., by identification module 104 and/or another system) to represent behaviors in a uniform format (e.g., including behaviors from a pre-defined set of behaviors, each such behavior being represented in a pre-defined manner). Additionally or alternatively, identification module 104 may derive the behavioral trace from existing behavioral information by translating the behavioral information to a uniform format (e.g., including behaviors from a pre-defined set of behaviors, each such behavior being represented in a pre-defined manner). In this manner, the systems described herein may effectively use behavioral information from various programs in a consistent and unified analysis.

Identification module 104 may identify the behavioral trace in any of a variety of contexts. For example, identification module 104 may identify the behavioral trace in response to a request to classify the program (e.g., as malicious or benign). In some examples, identification module 104 may, at a client device (e.g., upon which the program is executing and/or has executed), identify the behavioral trace in order to provide the behavioral trace and/or information derived from the behavioral trace to a server for analysis and/or classification. Additionally or alternatively, identification module 104 may, at a server (e.g., providing one or more security services), identify the behavioral trace received from a client device. In another example, identification module 104 may operate as a part of an automated behavioral analysis system that executes programs (e.g., in a controlled environment) in order to collect behavioral data describing the programs and aggregate and/or analyze the collected behavioral data.

Returning to FIG. 3, at step 304, one or more of the systems described herein may divide the behavioral trace to identify a plurality of n-grams within the behavioral trace, each runtime behavior within the sequence of runtime behaviors corresponding to an n-gram token. For example, division module 106 may, as part of computing device 202 in FIG. 2, divide behavioral trace 112 to identify plurality of n-grams 220 within behavioral trace 112, each runtime behavior within sequence of runtime behaviors 212 corresponding to an n-gram token.

The term "n-gram," as used herein, may refer to any sequence of data units and/or tokens within a sequence of data units and/or tokens. For example, the term "n-gram" may refer to a sequence of runtime behaviors (e.g., data units and/or tokens representing runtime behaviors). The n-grams may include any suitable sequence length. For example, the n-grams may include 2-grams (e.g., sequences of two runtime behaviors). As another example, the n-grams may include 4-grams (e.g., sequences of four runtime behaviors).

The term "n-gram token," as used herein, may refer to any token and/or data unit that encodes and/or represents a distinct element of an n-gram. For example, a 3-gram may include a sequence of three n-gram tokens. Examples of n-gram tokens may include runtime behaviors that have been encoded (e.g., according to a predetermined standard and/or format) to represent the specific runtime behavior and/or the type of runtime behavior. In some examples, n-gram tokens may also have been encoded to include one or more contextual runtime conditions under which a runtime behavior was observed. In some examples, one or more of the systems described herein may encode the n-gram tokens from observed runtime behaviors and/or contextual runtime conditions. For example, identification module 104 and/or division module 106 may encode the n-gram tokens. Additionally or alternatively, identification module 104 and/or division module 106 may receive already-tokenized runtime behaviors and/or contextual runtime conditions from another system.

Division module 106 may divide the behavioral trace to identify the plurality of n-grams in any suitable manner. For example, division module 106 may identify an n-gram starting with a given runtime behavior by including the runtime behavior as the first element of the n-gram and adding the runtime behaviors following the given runtime behavior to complete the n-gram. By repeating this process for each runtime behavior, division module 106 may identify all possible n-grams for the behavioral trace. Accordingly, division module 106 may identify overlapping n-grams (e.g., n-grams with shared elements). In some examples, as will be explained in greater detail below, division module 106 may only identify n-grams from a portion of the behavioral trace.

Figure 5:
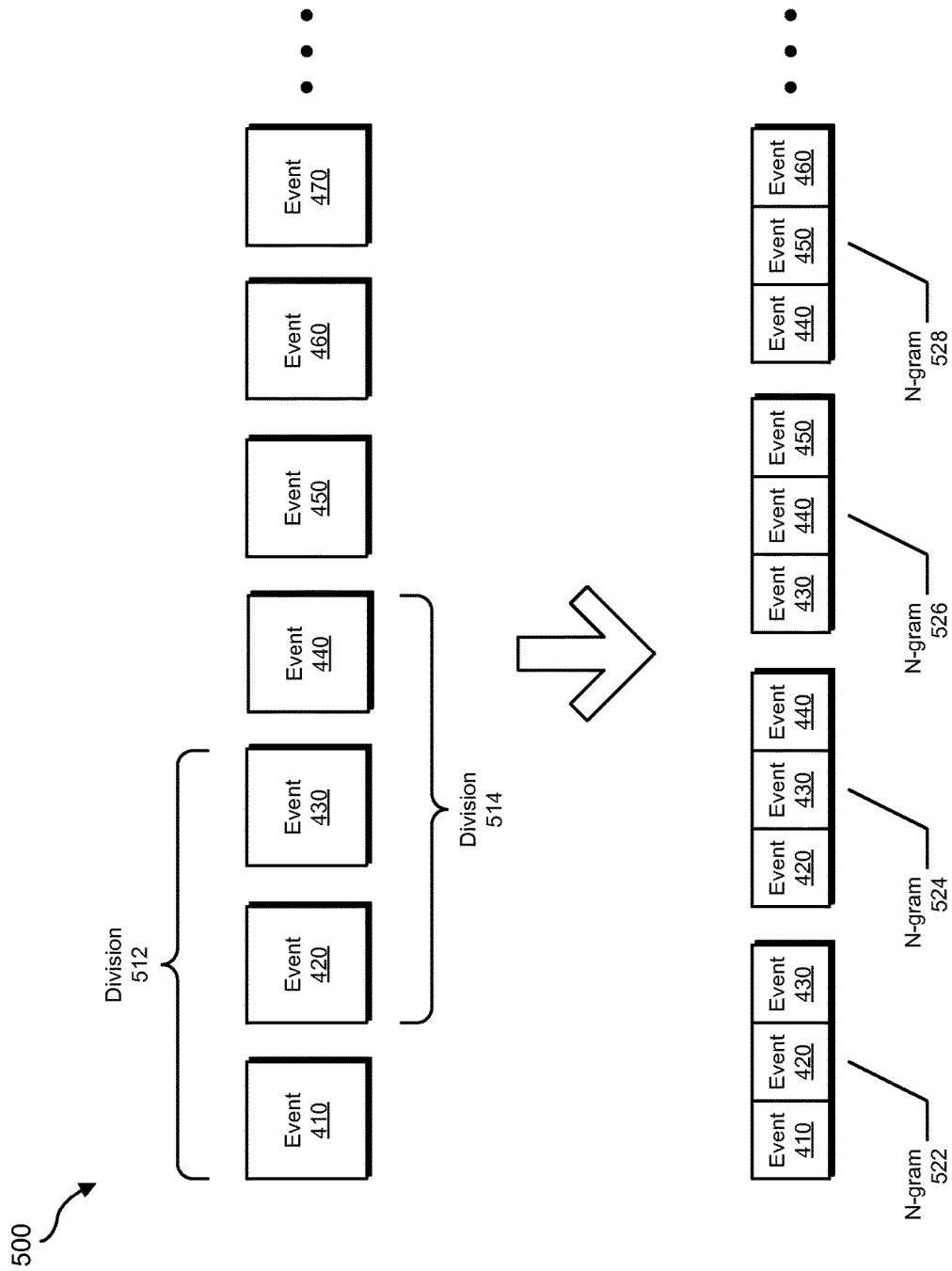
FIG. 5 is a block diagram of exemplary behavioral data for detecting malware.

As an example of forming n-grams from behavioral data, FIG. 5 illustrates exemplary behavioral data 500. As shown in FIG. 5, division module 106 may divide a sequence of events (including, e.g., events 410, 420, 430, 440, 450, 460, and 470) into a set of n-grams (including, e.g., n-grams 522, 524, 526, and 528. For example, division module 106 may identify an n-gram (e.g., a 3-gram) of events starting with each event in the sequence of events. For example, starting with event 410, division module 106 may identify a division 512 to identify n-gram 522. Continuing to event 420, division module 106 may identify a division 514 to identify n-gram 524. In this manner, division module 106 may identify n-gram 526 starting with event 430, n-gram 528 starting with event 440, and so forth.

In some examples, division module 106 may identify only a subset of possible n-grams (e.g., of a given size) within the behavioral trace. For example, as will be explained in greater detail below, making use of all n-grams within the behavioral trace to generate a feature vector may result in a feature vector that is noisier and less likely to yield helpful information. Accordingly, in some examples, division module 106 may identify the plurality of n-grams within the behavioral trace by identifying the plurality of n-grams within a substring of the behavioral trace.

Division module 106 may identify the plurality of n-grams within any suitable substring. For example, division module 106 may identify a substring of a predetermined size and/or relative location. In some examples, division module 106 may identify the plurality of n-grams within the substring of the behavioral trace by identifying the plurality of n-grams within a prefix of the behavioral trace. For example, division module 106 may identify a prefix of a predetermined size (e.g., 20 runtime behaviors, 64 runtime behaviors, etc.). Division module 106 may then identify the plurality of n-grams from the identified prefix (instead of, e.g., from the entire behavioral trace). In this manner, division module 106 may identify a plurality of n-grams of a consistent number and from a consistent location. In addition, by focusing later analysis to n-grams observed within a prefix of the behavioral trace, the systems described herein may be more likely to identify malicious operations, as malware may tend to exhibit malicious behaviors near the beginning of the execution of a program.

In some examples, division module 106 may identify the plurality of n-grams within the substring of the behavioral trace by dividing the behavioral trace into a plurality of fixed-length substrings and identifying the plurality of n-grams within a fixed-length substring within the plurality of fixed-length substrings. For example, division module 106 may identify a substring of the first 32 runtime events and identify a set of n-grams within the substring. Division module 106 may then identify a subsequent substring of the next 32 runtime events and identify a separate set of n-grams within the subsequent substring. In one example, the size of the behavioral trace may not be equally divisible by the fixed length of the substrings. In this example, division module 106 may divide the behavioral trace into fixed-length substrings excepting a remaining substring (e.g., at the end of the behavioral trace). Division module 106 may then reformat the remaining, shorter substring into a substring of the fixed length (e.g., by padding the substring with null tokens). For example, division module 106 may identify a behavioral trace of 508 events and divide the behavioral trace into substrings of 16 events. Accordingly, division module 106 may produce 31 substrings of 16 events and a final substring of 12 events. Division module 106 may therefore pad the final substring of 12 events with four null events such that the final substring shares the same fixed length of 16 events with the first 31 substrings.

As an example of selecting substrings of behavioral trace data, FIG. 6 illustrates exemplary behavioral data 600. As shown in FIG. 6, various substrings may be identified within and/or extracted from a behavioral trace 610. For example, division module 106 may identify a prefix 612 of behavioral trace 610 (and, e.g., identify a set of n-grams within prefix 612). In some examples, division module 106 may identify multiple prefixes (e.g., of different lengths). For example, division module 106 may identify a prefix 614 and a prefix 616 in addition to prefix 612. In these examples, division module 106 may identify sets of n-grams contained within prefixes 612, 614, and 616, respectively. In another example, division module 106 may divide behavioral trace 610 into fixed-length substrings, such as substrings 624, 626, and 628.

Returning to FIG. 3, at step 306, one or more of the systems described herein may analyze the plurality of n-grams to generate a feature vector of the behavioral trace. For example, analysis module 108 may, as part of computing device 202 in FIG. 2, analyze plurality of n-grams 220 to generate feature vector 230 of behavioral trace 112.

The term "feature vector," as used herein, may refer to any data structure and/or representation of one or more characteristics of a larger data set. In some examples, the term "feature vector" may refer to a multi-dimensional data point that may be used in a statistical analysis (such as a machine learning algorithm). For example, the feature vector of the behavioral trace may represent one or more features of the behavioral trace (e.g., n-grams and/or properties of n-grams observed within the behavioral trace). Thus, the feature vector may include a plurality of dimensions, each n-gram within the plurality of n-grams corresponding to a dimension within the plurality of dimensions. Accordingly, one or more of the systems described herein may use the feature vector as input to a machine learning classifier (e.g., in order to draw an inference about the behavioral trace, and, thus, the program that yielded the behavioral trace). Additionally or alternatively, one or more of the systems described herein may use a feature vector (along with, e.g., a classification) to train a machine learning classifier and/or as input in a statistical analysis. In some examples, each possible n-gram may correspond to a predetermined dimension of the feature vector.

Analysis module 108 may analyze the plurality of n-grams to generate the feature vector in any suitable manner. For example, analysis module 108 may build the feature vector by modifying the values of one or more dimensions of the feature vector based on n-grams observed in the behavioral trace (e.g., n-grams identified by division module 106 as within the plurality of n-grams).

In some examples, analysis module 108 may analyze the plurality of n-grams to generate the feature vector of the behavioral trace by applying, for each given n-gram in the plurality of n-grams, a feature function to the behavioral trace that describes an occurrence characteristic of the given n-gram within the behavioral trace and including a result of the feature function in the feature vector.

The term "feature function," as used herein, may refer to any function that maps an n-gram and/or data derived from an n-gram to a value (e.g., a value that is used to represent a feature of the behavioral trace) and/or any procedure for generating a value representing a feature relating to the occurrence of one or more n-grams in the behavioral trace. In one example, the feature function may include a boolean function that outputs a predetermined boolean output for the given n-gram when the given n-gram was observed within the behavioral trace. For example, the feature function may output a "true" value (or, e.g., a numerical equivalent) for an n-gram when the n-gram is observed within the plurality of n-grams. Accordingly, analysis module 108 may set a dimension of the feature vector corresponding to the n-gram to "true" if the n-gram is observed within the plurality of n-grams of the behavioral trace. Similarly, analysis module 108 may set the dimension of the feature vector to "false" if no n-gram corresponding to the dimension is observed within the plurality of n-grams of the behavioral trace.

In one example, the feature function may include a frequency function that outputs a value for the given n-gram that indicates a number of times the given n-gram was observed within the behavioral trace. For example, the feature function may increment a value for the n-gram when n-gram is observed within the behavioral trace. Accordingly, analysis module 108 may set a dimension of the feature vector corresponding to the n-gram to a number of occurrences of the n-gram within the plurality of n-grams of the behavioral trace (or, e.g., to a number of occurrences of a subset of n-grams that all correspond to the dimension of the feature vector). Thus, the dimension of the feature vector may indicate a frequency of one or more corresponding n-grams within the behavioral trace.

In one example, the feature function may include a density function that outputs a value for the given n-gram that indicates a relative frequency with which the given n-gram was observed within the behavioral trace. For example, the feature function may correspond to the frequency with which one or more corresponding n-grams appear within the plurality of n-grams of the behavioral trace divided by a total number of n-grams that appear within the plurality of n-grams of the behavioral trace.

In some examples, the plurality of n-grams may map to the plurality of dimensions according to a surjection. In these examples, including the result of the feature function in the feature vector may include aggregating a subset of outputs of the feature function derived from a subset of the plurality of n-grams into a value and assigning the value to a dimension within the plurality of dimensions according to the surjection.

For example, a behavioral trace my identify behaviors from a set of 80 predefined behaviors. In addition, the systems described herein may divide the behavioral trace to identify 3-grams of the behavior trace. Because a potential 3-gram could include any of the predefined behaviors in each of the three positions in the 3-gram, such a configuration would result in 512,000 distinct possible 3-grams. However, a feature vector with 512,000 distinct dimensions may be computationally expensive to process, store, and/or analyze, especially where a classifier may potentially draw from millions of similar feature vectors. Accordingly, analysis module 108 may reduce the size of the feature vector by reducing the analysis space via a surjection of possible n-grams onto a smaller space. For example, the surjection may involve a hash function with a domain of all possible n-grams and a range of a significantly smaller cardinality. Thus, in the earlier example, analysis module 108 may map the 512,000 possible 3-grams onto 150 possible hash values. Thus, the feature vector may include 150 dimensions. The value of each dimension may represent an aggregation of values of the feature function for the various n-grams that correspond to that dimension. For example, where the feature function is a boolean function, the value of a dimension may be "true" if any of the n-grams that map to that dimension (e.g., according to a hash function) appears in the behavioral trace (or, e.g., the substring of the behavioral trace being analyzed) and "false" if none of the n-grams that map to that dimension appear. Likewise, where the feature function is a frequency function, the value of a dimension may equal the sum of the appearances of all of the n-grams that map to that dimension.

As an example of generating a feature vector, FIG. 7 illustrates an exemplary system 700 for malware detection. As shown in FIG. 7, system 700 may include a set of n-grams (including, e.g., n-grams 522, 524, 526, and 528) observed within a substring of a behavioral trace, each of which may be provided as input to a hash function 710. In this example, hash function may map the space of all possible n-grams to 16 buckets. The hashes may then be provided as input to a feature function 720 (e.g., a frequency function). Feature function 720 may then aggregate the hashes corresponding to each of the 16 buckets (e.g., by counting the number of times each hash corresponding to a given bucket was observed). Thus, for example, a feature vector 730 may include 16 dimensions (e.g., corresponding to the 16 buckets mapped to by hash function 710). Feature function 720 may assign a value of 2 to dimension 732, representing two observations of the hash corresponding to dimension 732 (e.g., two observations of n-grams that hash to dimension 732). Likewise, feature function 720 may assign a value of 0 to dimension 734, representing zero observations of the hash corresponding to dimension 734 (e.g., zero observations of n-grams that hash to dimension 734). Similarly, feature function 720 may assign a value of 3 to dimension 736, representing three observations of the hash corresponding to dimension 736 (e.g., three observations of n-grams that hash to dimension 736). In some examples, as will be explained in greater detail below, the hashes generated by hash function 710 may be used as input to multiple feature functions, each feature function providing values to corresponding feature vectors. In addition, in some examples, different sets of n-grams (e.g., identified in different substrings of the behavioral trace) may be provided as input to hash function 710, thereby generating multiple feature vectors corresponding to distinct substrings of the behavioral trace.

In one example, generating the feature vector of the behavioral trace comprises generating a plurality of feature vectors of the behavioral trace, the feature vectors within the plurality of feature vectors differing by feature functions applied to n-grams sampled from the behavioral trace to generate respective feature vectors. Additionally or alternatively, the feature vectors may differ by subsets of n-grams selected from the behavioral trace to generate respective feature vector. Thus, for example, if the systems described herein generate n-gram sets for four substrings of the behavioral trace and apply each of these n-gram sets to three different feature functions, analysis module 108 may produce 12 distinct feature vectors representing the behavioral trace.

Returning to FIG. 3, at step 308, one or more of the systems described herein may classify the program based at least in part on the feature vector of the behavioral trace to determine whether the program is malicious. For example, classification module 110 may, as part of computing device 202 in FIG. 2, classify program 210 based at least in part on feature vector 230 of behavioral trace 112 to determine whether program 210 is malicious.

Classification module 110 may classify the program based on the feature vector in any suitable manner. For example, classification module 110 may use and/or submit the feature vector to a machine learning classifier (e.g., that has been trained with a corpus of feature vectors generated from previously classified behavioral traces). The machine learning classifier may include any suitable machine learning technique and/or model. For example, the machine learning classifier may include a decision tree and/or a support vector machine. Generally, classification module 110 may use any method of statistical analysis to classify the feature vector (e.g., based on statistical similarities to behavioral traces known to correspond to malicious behavior and/or malicious programs). As used herein, the term "malicious" may refer to any undesired, illegitimate, vulnerable, and/or unsafe behavior and/or program.

Classification module 110 may classify the program according to any of a variety of classification schemes. For example, classification module 110 may classify the program as malicious or benign. Additionally or alternatively, classification module 110 may classify the program as malicious, uncertain, or benign. In some examples, classification module 110 may classify the program as belonging to a specified class of malware and/or demonstrating a specified class of exploit and/or malicious behavior. In some examples, classification module 110 may assign a rating and/or confidence level describing the level of maliciousness and/or the likelihood of maliciousness of the program. Additionally or alternatively, classification module 110 may attribute multiple classifications to the program (e.g., based on multiple feature vectors) and aggregate the multiple classifications to generate a single rating and/or classification of the program.

As explained earlier, in some examples the systems described herein may generate multiple feature vectors for the behavioral trace corresponding to different substrings of the behavioral trace and/or different feature functions applied to the n-grams of the behavioral trace. In these examples, classification module 110 may submitting each of the feature vectors to a machine learning classifier. In some examples, classification module 110 may then aggregate the classifications produced by the machine learning classifier. For example, classification module 110 may determine that the program is malicious if at least one of the classifications indicates malicious behavior. Additionally or alternatively, classification module 110 may increase a confidence of maliciousness based on receiving multiple classification results indicating malicious behavior.

As explained above in connection with method 300 in FIG. 3, systems described herein may monitor a program and extract runtime features at the occurrence of each event (e.g., a system call, an API call) produced during the execution of the program. These features may include the specific event along with other runtime attributes such as the number of threads, the number of libraries loaded, the presence of a graphical user interface, etc. The systems described herein may use these features in machine learning techniques such as clustering and/or classification.

In some examples, the systems described herein may extract sequential features from an event sequence ($e_1$, $e_2$, $e_3$, ...). For example, the systems described herein may use a method to generate M sequential features. In this example, E may represent the set of all possible K distinct events. A program's execution may generate a sequence of events, where each event belongs to E. An event n-gram may be represented as a contiguous sequence of n events. Thus, where S represents the set of all possible n-grams, the size of S may be $K^N$.

Given a program trace T of an event sequence, the systems described herein may extract all the n-grams by moving a window of n events over the event sequence. For each distinct n-gram g, a feature function feat(g, T) may capture a feature of T relating to g. For example, boolean(g, T) may be defined as boolean(g, T)=0 if n-gram g is not seen in T; else boolean(g, T)=1. A feature function frequency(g, T) may be defined as the number of times n-gram g occurs in T. A feature function probability(g, T) may be defined as frequency(g, T)/(T−N+1) when T>N.

The systems described herein may use a feature function, such as any of the above-specified feature functions, to generate a feature vector to encode sequential information in the event trace. However, a feature vector constructed to represent the results of the feature function for each n-gram in S may be huge (e.g. proportional to the size of 5). Accordingly, in some examples, the systems described herein may reduce the size of the feature vector to a smaller size M by hashing. For example, a hash function H(g) may hash an n-gram g to an index i in the range [1, M]. By hashing n-grams, the systems described herein may approximate feature vectors without losing the efficacy of the feature vectors.

In one example, the systems described herein may generate a feature vector V of size M. The systems described herein may initialize each element of V with a value 0. For each n-gram g that the systems described herein observe in T, the systems described herein may update V depending on the feature function used. For example, for the boolean feature function, V[H(g)]=V[H(g)] OR boolean(g, T). For the frequency feature function, V[H(g)]=V[H(g)]+frequency(g, T). For the probability feature function, V[H(g)]=V[H(g)]+probability(g, T).

The systems described herein may apply the examples described above to the entire event trace and/or to a fixed length prefix of the event trace. Some event traces may be long but the distinguishing behavior may be shown in a small section of the trace. To address this, the systems described herein may process several prefixes of different lengths (e.g., 50, 100, 150, etc.). These systems may then extract M features for each of these prefixes. Additionally or alternatively, the systems described herein may process fixed-length non-overlapping substrings of the event trace. These systems may extract M features for each of the substrings. Where a trace is smaller than a fixed length used (e.g., for a fixed-length prefix), the systems described herein may zero-fill the sequential features to reach the fixed length. In one example, the systems described herein may use a continuous valued feature that represents the total number of events observed (irrespective of the event type).

Figure 8:
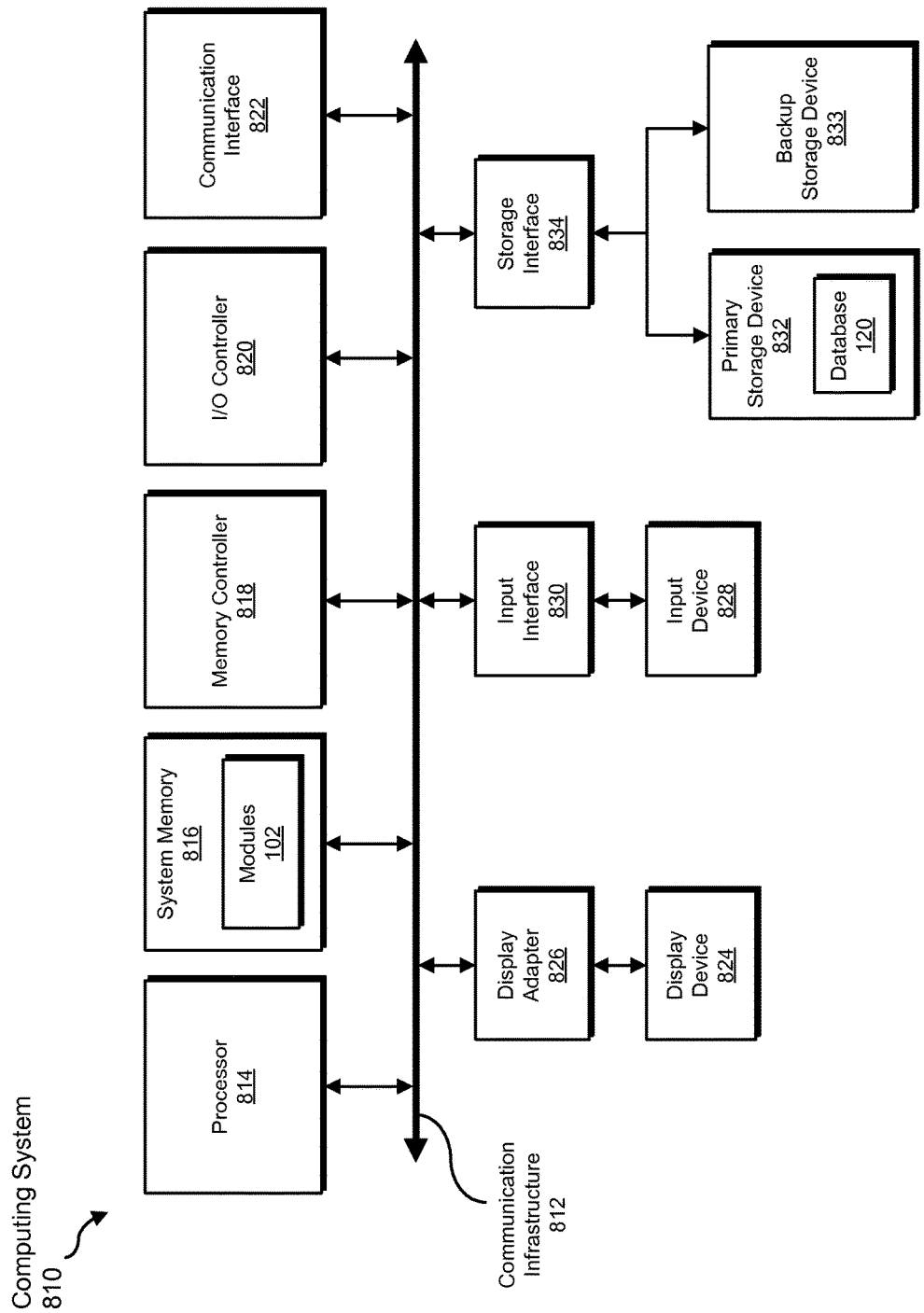
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the exemplary embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810. In one example, database 120 from FIG. 1 may be stored in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an Application Specific Integrated Circuit (ASIC) adapted to implement one or more of the exemplary embodiments disclosed herein.

Figure 9:
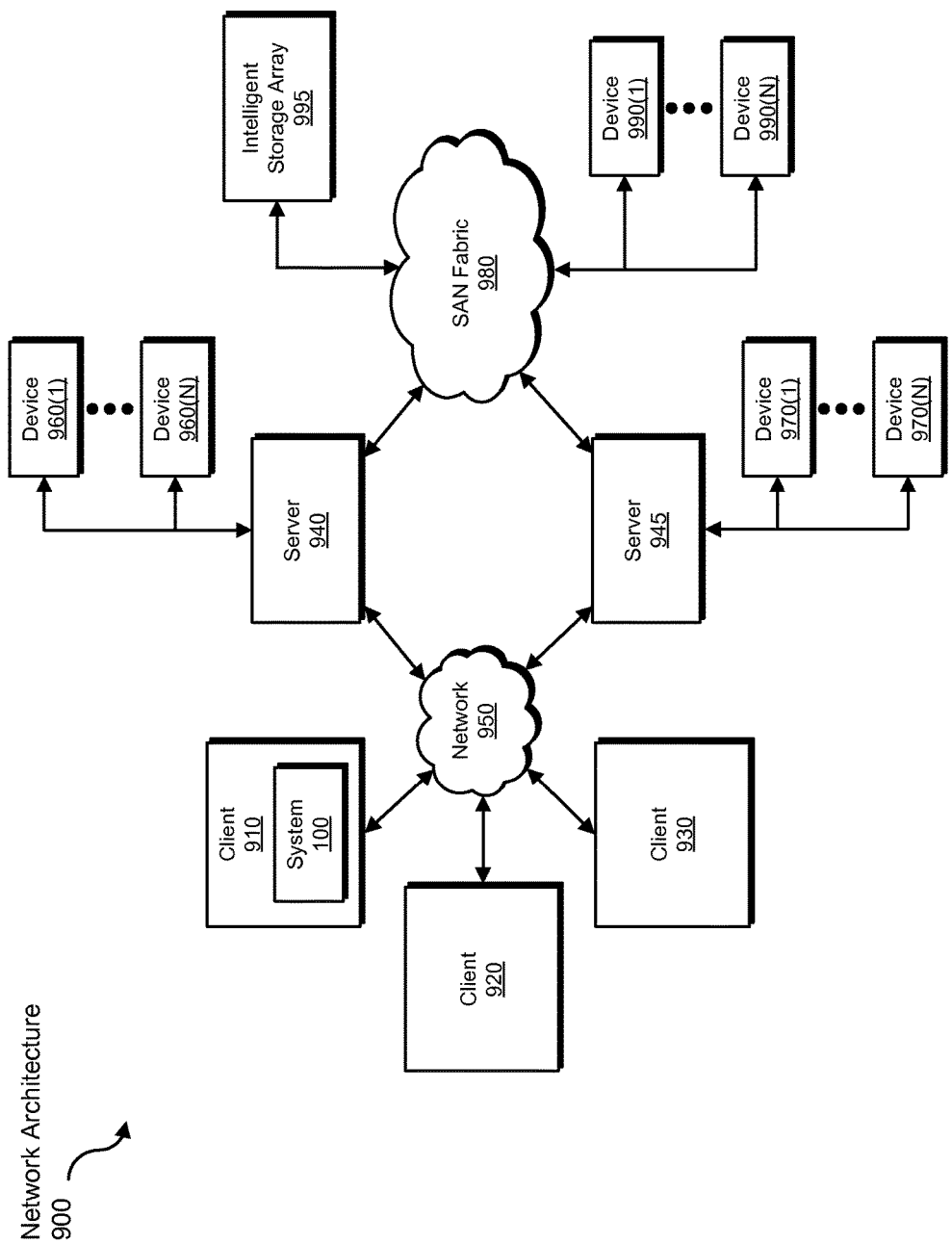
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the instant disclosure.

Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an exemplary method for detecting malware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an event trace to be transformed, transform the event trace to a set of n-grams, output a result of the transformation to feature vector, use the result of the transformation to classify a program that produced the events of the event trace, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components)

connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting malware, at least a portion of the method being performed by a computing device comprising at least one processor, the method comprising:
   identifying a behavioral trace of a program, the behavioral trace comprising a sequence of runtime behaviors exhibited by the program;
   dividing the behavioral trace to identify a plurality of n-grams within the behavioral trace, each runtime behavior within the sequence of runtime behaviors corresponding to an n-gram token;
   analyzing the plurality of n-grams to generate a feature vector of the behavioral trace comprising:
      applying, for each given n-gram in the plurality of n-grams, a feature function to the behavioral trace that describes an occurrence characteristic of the given n-gram within the behavioral trace; and
      including a result of the feature function in the feature vector; and
   classifying the program based at least in part on the feature vector of the behavioral trace to determine whether the program is malicious;
   wherein:
      the feature vector comprises a plurality of dimensions, each n-gram within the plurality of n-grams corresponding to a dimension within the plurality of dimensions;
      the plurality of n-grams map to the plurality of dimensions according to a non-injective surjection; and
      including the result of the feature function in the feature vector comprises aggregating a subset of outputs of the feature function derived from a subset of the plurality of n-grams into a value and assigning the value to a dimension within the plurality of dimensions according to the non-injective surjection.

2. The computer-implemented method of claim 1, wherein the feature function comprises a boolean function that outputs a predetermined boolean output for the given n-gram when the given n-gram was observed within the behavioral trace.

3. The computer-implemented method of claim 1, wherein the feature function comprises a frequency function that outputs a value for the given n-gram that indicates a number of times the given n-gram was observed within the behavioral trace.

4. The computer-implemented method of claim 1, wherein the feature function comprises a density function that outputs a value for the given n-gram that indicates a relative frequency with which the given n-gram was observed within the behavioral trace.

5. The computer-implemented method of claim 1, wherein identifying the plurality of n-grams within the behavioral trace comprises identifying the plurality of n-grams within a substring of the behavioral trace.

6. The computer-implemented method of claim 5, wherein identifying the plurality of n-grams within the substring of the behavioral trace comprises identifying the plurality of n-grams within a prefix of the behavioral trace.

7. The computer-implemented method of claim 5, wherein identifying the plurality of n-grams within the substring of the behavioral trace comprises dividing the behavioral trace into a plurality of fixed-length substrings and identifying the plurality of n-grams within a fixed-length substring within the plurality of fixed-length substrings.

8. The computer-implemented method of claim 1, wherein:
   generating the feature vector of the behavioral trace comprises generating a plurality of feature vectors of the behavioral trace, the feature vectors within the plurality of feature vectors differing by at least one of:
      feature functions applied to n-grams sampled from the behavioral trace to generate respective feature vectors;
      subsets of n-grams selected from the behavioral trace to generate respective feature vectors; and
   classifying the program based at least in part on the feature vector of the behavioral trace comprises submitting each of the plurality of feature vectors to a machine learning classifier.

9. The computer-implemented method of claim 1, wherein the sequence of runtime behaviors specifies a contextual runtime condition under which at least one runtime behavior was observed.

10. The computer-implemented method of claim 1, further comprising determining the program is malware based on the classification of the program.

11. The computer-implemented method of claim 10, further comprising protecting the computing device from the malware.

12. A system for detecting malware, the system comprising:
   an identification module, stored in memory, that identifies a behavioral trace of a program, the behavioral trace comprising a sequence of runtime behaviors exhibited by the program;
   a division module, stored in memory, that divides the behavioral trace to identify a plurality of n-grams within the behavioral trace, each runtime behavior within the sequence of runtime behaviors corresponding to an n-gram token;
   an analysis module, stored in memory, that analyzes the plurality of n-grams to generate a feature vector of the behavioral trace comprising:
      applying, for each given n-gram in the plurality of n-grams, a feature function to the behavioral trace that describes an occurrence characteristic of the given n-gram within the behavioral trace; and
      including a result of the feature function in the feature vector;
   wherein:
      the feature vector comprises a plurality of dimensions, each n-gram within the plurality of n-grams corresponding to a dimension within the plurality of dimensions;
      the plurality of n-grams map to the plurality of dimensions according to a non-injective surjection; and
      including the result of the feature function in the feature vector comprises aggregating a subset of outputs of the feature function derived from a subset of the plurality of n-grams into a value and assigning the value to a dimension within the plurality of dimensions according to the non-injective surjection;

a classification module, stored in memory, that classifies the program based at least in part on the feature vector of the behavioral trace to determine whether the program is malicious; and at least one physical processor configured to execute the identification module, the division module, the analysis module, and the classification module.

13. The system of claim 12, wherein the feature function comprises a boolean function that outputs a predetermined boolean output for the given n-gram when the given n-gram was observed within the behavioral trace.

14. The system of claim 12, wherein the feature function comprises a frequency function that outputs a value for the given n-gram that indicates a number of times the given n-gram was observed within the behavioral trace.

15. The system of claim 12, wherein the feature function comprises a density function that outputs a value for the given n-gram that indicates a relative frequency with which the given n-gram was observed within the behavioral trace.

16. The system of claim 12, wherein the classification module further determines the program is malware based on the classification of the program.

17. The system of claim 16, wherein the classification module further protects the system from the malware.

18. A non-transitory computer-readable medium comprising one or more computer-readable instructions that, when executed by at least one processor of a computing device, cause the computing device to:

identify a behavioral trace of a program, the behavioral trace comprising a sequence of runtime behaviors exhibited by the program;

divide the behavioral trace to identify a plurality of n-grams within the behavioral trace, each runtime behavior within the sequence of runtime behaviors corresponding to an n-gram token;

analyze the plurality of n-grams to generate a feature vector of the behavioral trace comprising;

applying, for each given n-gram in the plurality of n-grams, a feature function to the behavioral trace that describes an occurrence characteristic of the given n-gram within the behavioral trace;

including a result of the feature function in the feature vector; and classifying the program based at least in part on the feature vector of the behavioral trace to determine whether the program is malicious wherein:

the feature vector comprises a plurality of dimensions, each n-gram within the plurality of n-grams corresponding to a dimension within the plurality of dimensions;

the plurality of n-grams map to the plurality of dimensions according to a non-injective surjection; and including the result of the feature function in the feature vector comprises aggregating a subset of outputs of the feature function derived from a subset of the plurality of n-grams into a value and assigning the value to a dimension within the plurality of dimensions according to the non-injective surjection.

19. The non-transitory computer-readable medium of claim 18, wherein the one or more computer-readable instructions further cause the computing device to determine the program is malware based on the classification of the program.

20. The non-transitory computer-readable medium of claim 19, further comprising protecting the computing device from the malware.

* * * * *